June 17, 1947.  T. L. FAWICK  2,422,227
ASSEMBLY FOR BRAKES AND CLUTCHES
Filed Oct. 12, 1944

INVENTOR.
THOMAS L. FAWICK
BY
Willard D. Eakin

Patented June 17, 1947

2,422,227

UNITED STATES PATENT OFFICE 2,422,227

ASSEMBLY FOR BRAKES AND CLUTCHES

Thomas L. Fawick, Akron, Ohio

Application October 12, 1944, Serial No. 558,377

6 Claims. (Cl. 188—152)

This invention relates to clutches and brakes that are actuated by distension of a fluid-distensible member, as in my U. S. Patents 2,111,422; 2,205,521; 2,237,864; 2,251,443; 2,251,444; and 2,251,445.

Its chief objects are to provide a simple, convenient and inexpensive construction in the matter of mounting the fluid-distensible member or members in proper relation to the other parts of the structure; to provide for quick and easy assembly and disassembly of the parts; and to provide other advantages which will be manifest in the following description.

Referring to the drawings.

Figure 1:
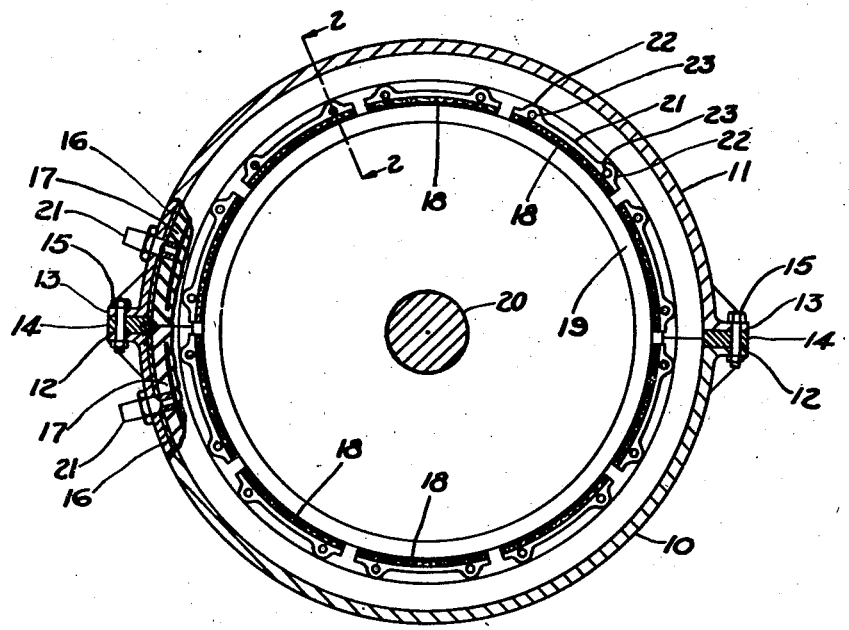
Fig. 1 is an elevation, with parts broken away and in section, of a brake assembly embodying my invention in its preferred form.

Referring to the drawings, 10 is the substantially semi-cylindrical lower section of a non-rotating housing of which the similar upper section is shown at 11. The lower section 10 is formed at its respective sides with apertured attaching lugs 12, 12 and the upper section 11 is likewise formed with attaching lugs 13, 13. A spacing block 14, which also serves as a stop member, is mounted between the lugs 12, 13 of each pair and the housing sections and blocks are held in assembled relation by bolts such as the bolts 15, 15.

Figure 2:
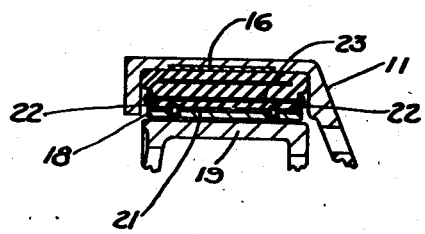
Fig. 2 is a section on line 2—2 of Fig. 1.

Each of the sections 10 and 11 is formed throughout its length with an internal groove (see Fig. 2) adapted to receive with a snug fit a flexible metal base or backing plate 16 which is secured by vulcanization to the outer face of an arcuate bag 17 formed of rubber or the like and adapted to be distended inwardly, toward the axis of rotation, for engagement of brake shoes 18, 18, mounted upon the inner periphery of the bag, with a brake drum 19 secured upon the shaft or axle 20, each of the bags being provided with an inlet-outlet stem 21 extending through its base plate 16 and through the wall of the respective housing section in which the bag is mounted.

Each of the base plates 16 is firmly held in its groove in the housing section, and is held against circumferential sliding movement therein, by its ends contacting the spacer and stop blocks 14.

The brake shoes 18, preferably but not necessarily, are of the type described and claimed in my U. S. Patent No. 2,251,445, the frictional material of each being riveted to a saddle-like base plate 21 which has near each of its ends a pair of ears 22, 22 adapted to straddle the tread portion of the distensible bag, the wear shoe assembly being held in place, for retraction of the shoes upon retraction of the bag, by pins 23, 23 extending through the ears of the respective pairs and through the rubber tread portion of the bag lying between the ears.

In the embodiment here shown the torque is sustained by the rubber-like bag, but my invention is not wholly limited to that type of assembly.

In assembling the parts, the lower housing section 10 being mounted with suitable support (not shown), the lower one of the arcuate bags 17 is laid therein with the bag's backing plate 16 in the groove of the housing member and with its inlet-outlet stem 21 extending through the wall of the housing member.

The brake drum 19 is then put in position, after which the blocks 14 are put in place and the upper bag 17 and its housing section 11 are brought down from above and secured in place by the bolts 15, the entire operation being free of difficulty.

Preferably, the distensible bags are symmetrical in cross-section, with relation to the backing plate 16 and the inlet-outlet stem 21, so that the bags are interchangeable.

My invention is not wholly limited to any particular manner of supporting the lower housing section nor to the particular order just described for assembling the parts.

For taking out one bag and inserting another in its place it is not necessary that the relationship of the shaft 20 and the lower housing section 10 be changed, but only that the brake-drum 19 be moved out of position to permit the inlet-outlet stem 17 to be inserted in its hole in the wall of the housing section.

Modifications are possible within the scope of the invention as defined in the appended claims.

I claim:

1. An assembly for use as a brake or the like, said assembly comprising inner and outer relatively rotary structures, the outer structure comprising a plurality of arcuate housing sections, means for securing them together in radially spaced relation to the inner structure, a plurality of arcuate, inwardly-distending fluid-distensible members in the space between the two structures, means for holding said members against rotation in relation to the housing sections, and means for conducting pressure fluid into said members for effecting frictional engagement of the two said structures.

2. An assembly for use as a brake or the like, said assembly comprising inner and outer, relatively rotary structures adapted for frictional engagement with each other, the outer structure comprising a plurality of separable housing sections and an arcuate, inwardly-distending, fluid-distensible member for effecting such engagement, a metal base-plate secured to said member, one of the housing sections constituting an arcuate metal backing member for said base plate, and means for holding said base plate in fixed relation to said housing section.

3. An assembly for use as a brake or the like, said assembly comprising inner and outer, relatively rotary structures adapted for frictional engagement with each other, the outer structure comprising a plurality of separable housing sections and an arcuate, inwardly-distending fluid-distensible member for effecting such engagement, a metal base plate secured by adhesion to said member, one of the housing sections constituting an arcuate metal backing member for said base plate, and means for holding said base-plate in fixed relation to said housing section.

4. An assembly for use as a brake or the like, said assembly comprising inner and outer, relatively rotary structures adapted for frictional engagement with each other, the outer structure comprising a plurality of separable housing sections and an arcuate, inwardly-distending fluid-distensible member for effecting such engagement, a metal base plate secured to said member, one of the housing sections constituting an arcuate metal backing member for said base plate, and means for holding said base-plate in fixed relation to said housing section, the housing section being formed with a recess for receiving the base-plate with a snug fit.

5. An assembly for use as a brake or the like, said assembly comprising inner and outer, relatively rotary structures adapted for frictional engagement with each other, the outer structure comprising a plurality of arcuate housing sections, means for securing them together, a plurality of arcuate, inwardly-distending fluid-distensible members mounted in said housing sections, and means for holding them against rotation therein.

6. An assembly for use as a brake or the like, said assembly comprising inner and outer, relatively rotary structures adapted for frictional engagement with each other, the outer structure comprising a plurality of arcuate housing sections, means for securing them together, a plurality of arcuate, fluid-distensible members mounted in said housing sections, and means for holding them against rotation therein, the said holding means comprising spacer blocks mounted between the housing sections.

THOMAS L. FAWICK.

REFERENCES CITED

The following references are of record in the file of this patent:

UNITED STATES PATENTS

| Number | Name | Date |
|---|---|---|
| 2,213,000 | Fawick | Aug. 27, 1940 |
| 2,245,682 | Kerr | June 17, 1941 |
| 2,252,128 | Kraft | Aug. 12, 1941 |